US008948771B2

(12) United States Patent
Koskela et al.

(10) Patent No.: US 8,948,771 B2
(45) Date of Patent: Feb. 3, 2015

(54) ENHANCEMENTS IN CHANNEL RELIABILITY IN SCENARIOS OPERATING ON SHARED BAND

(75) Inventors: Timo Koskela, Oulu (FI); Sami Hakola, Kempele (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/086,681

(22) Filed: Apr. 14, 2011

(65) Prior Publication Data

US 2012/0264440 A1     Oct. 18, 2012

(51) Int. Cl.
*H04W 72/00* (2009.01)
*H04B 7/14* (2006.01)
*H04B 7/00* (2006.01)
*H04W 4/00* (2009.01)
(Continued)

(52) U.S. Cl.
CPC ............ *H04W 16/14* (2013.01); *H04W 72/042* (2013.01); *H04W 72/00* (2013.01); *H04W 84/12* (2013.01)
USPC ............ 455/452.1; 455/8; 455/464; 455/509; 370/227; 370/228; 370/329

(58) Field of Classification Search
CPC ..... H04W 16/10; H04W 16/14; H04W 28/16; H04W 28/18; H04W 36/16; H04W 36/24; H04W 36/26; H04W 36/34; H04W 36/38; H04W 40/00; H04W 40/24; H04W 48/00; H04W 48/02; H04W 72/00; H04W 72/04; H04W 72/08; H04W 72/12; H04W 72/042; H04L 12/2422; H04L 29/06829; H04L 29/14; H04L 43/00; H04L 43/08; H04L 43/0811; H04L 45/22; H04L 45/28

USPC ............ 455/450–455, 435.1–445, 464, 8, 455/509–516; 370/225, 227–228, 252, 322, 370/329–341, 348, 431–545
See application file for complete search history.

(56) References Cited

U.S. PATENT DOCUMENTS

2003/0219002 A1     11/2003     Kishida
2006/0171305 A1*    8/2006      Stefani et al. ................. 370/228
(Continued)

FOREIGN PATENT DOCUMENTS

WO     WO-2010/044627 A2     4/2010
WO     WO-2010/088586 A2     8/2010
(Continued)

OTHER PUBLICATIONS

Search and Examination Report for Application No. GB 1106358.3 dated Aug. 19, 2011.
(Continued)

*Primary Examiner* — Michael Mapa
(74) *Attorney, Agent, or Firm* — Stanton IP Law

(57) ABSTRACT

The present invention proposes methods and devices for mobile communication deployed on shared bands, which enhance reliability of channels such as control channels. According to an aspect thereof, at a communication terminal, a list of channels useable for communication is maintained, information on the usability of a currently used channel is obtained, and it is switched to one of the channels of the list of useable channels if the currently used channel becomes unusable. The invention encompasses also corresponding computer products as well as methods, devices and computer products residing at a network node.

25 Claims, 6 Drawing Sheets

(51) Int. Cl.
*G01R 31/08* (2006.01)
*H04W 16/14* (2009.01)
*H04W 72/04* (2009.01)
*H04W 84/12* (2009.01)

(56) References Cited

U.S. PATENT DOCUMENTS

| | | |
|---|---|---|
| 2006/0171335 A1 | 8/2006 | Yuen et al. |
| 2007/0014253 A1 | 1/2007 | Lee et al. |
| 2007/0149214 A1* | 6/2007 | Walsh et al. ............... 455/456.1 |
| 2009/0252095 A1 | 10/2009 | Lu et al. |
| 2011/0216730 A1 | 9/2011 | Kim et al. |
| 2012/0071189 A1* | 3/2012 | Mody ........................ 455/515 |
| 2012/0184318 A1* | 7/2012 | Lee et al. ..................... 455/515 |

FOREIGN PATENT DOCUMENTS

| | | |
|---|---|---|
| WO | WO-2011/035328 A1 | 3/2011 |
| WO | WO-2011/096746 A2 | 8/2011 |

OTHER PUBLICATIONS

Tsukamoto, K. et al., *Distributed Channel Coordination in Cognitive Wirelss Vehicle-to-Vehicle Communications*, (undated), 7 pages.
Combined Search and Examination Report for Great Britain Application No. 1120064.9; dated Mar. 15, 2012.
Combined Search and Examination Report for Great Britain Application No. 1312715.4; dated Aug. 16, 2013.
Examination Report for Great Britain Application No. 1120064.9; dated Aug. 16, 2013.

* cited by examiner

| Carrier ID | Center Frequency | Bandwidth | Priority |
|---|---|---|---|
| #1 | 2.430 Mhz | 20 Mhz | 1 |
| #2 | 2.450 Mhz | 5 Mhz | 4 |
| #3 | 2.460 Mhz | 5 Mhz | 3 |
| #4 | 2.470 Mhz | 5 Mhz | 2 |
| ... | | | |

Fig. 3

ENHANCEMENTS IN CHANNEL RELIABILITY IN SCENARIOS OPERATING ON SHARED BAND

FIELD OF THE INVENTION

The present invention generally relates to enhancements on channel reliability in scenarios operating on shared band. More particularly, the present invention addresses methods, devices and computer product claims for systems operated on shared bands, which enhance reliability of channels.

BACKGROUND

Mobile data transmission and data services are constantly making progress. With the increasing penetration of such services, a need for increased bandwidth for conveying the data is emerging. In hitherto known scenarios, networks operated on reserved bands (licensed bands) within the available spectrum, which were reserved for the particular network. As licensed band operation has been increasingly utilized, portions of the radio spectrum that remain available have become limited. Thus, operators, service providers, communication device manufacturers, and communication system manufacturers, are all seeking efficient solutions to utilize unlicensed shared band operation. Communication on an unlicensed shared band is generally based on sharing an available channel between different communication devices. The different communication devices may utilize a common radio access technology (RAT). However, in certain scenarios, the different communication devices may utilize different RATs. In an unlicensed shared band, channel access can be distributed, where communication devices can detect a channel, and utilize a channel reservation scheme known to other communication devices in order to reserve a right to access the channel. In distributed channel access, a transmitting communication device and a receiving communication device are generally not synchronized to a global reference.

Currently, a system known as Long Term Evolution, LTE, is being further developed. When the LTE system concept is further extended in a way that it can be deployed also on unlicensed bands, the devices and local access points (APs) have potentially more spectrum available. That spectrum is to be used opportunistically as explained above. This setting can be considered as a kind of non-contiguous carrier aggregation, in which unlicensed spectrum is used as resources or "ground" for secondary carriers/cells for the licensed spectrum primary and secondary carriers/cells, controlled by the network transceiver station (or access node) known as Evolved Node_B, eNB. One step further would be to deploy an eNB totally on some shared band, like in television white space TVWS or in the industrial, scientific and medical, ISM, band without any anchor in licensed spectrum (in EUTRAN level) (Evolved Universal Terrestrial Radio Access Network) similar to WLAN deployments to make LTE an alternative solution against widely adopted IEEE technologies.

As a future LTE-A system may be deployed on unlicensed bands (e.g. TVWS or ISM bands), such environment sets further requirements/challenges for the system to operate appropriately.

In particular, the dynamic interference environment is very peculiar to the shared bands such as ISM (Industrial, Scientific, Medical) and Television White Spaces (TV WS). The quality of the communication link may change quite rapidly due to an unknown interferer (e.g. another system's device or devices occupying the band) or if the incumbent user decides to deploy the channel. Although the Quality of Service (QoS) cannot be guaranteed on the shared bands where the available resource is shared between secondary users, the service continuity should be protected in case of a sudden degradation of the signal quality or if the used channel becomes occupied. Especially the re-establishment of control channels on secondary channels is crucial in order to guarantee the service continuity on shared bands.

In one approach, secondary communication channels of an unlicensed band are e.g. derived based on GPS information for direct communication between communication devices without network node(s) being involved.

Thus, there is still a need to further improve such systems, in particular it is crucial to have reliable control channels so as to maintain and enable control of the system.

SUMMARY

Various aspects of examples of the invention are set out in the claims.

According to a first aspect of the present invention, there is provided a method comprising maintaining, at a communication terminal, a list of channels useable for communication, obtaining, at the communication terminal, information on the usability of a currently used channel, switching, at the communication terminal, to one of the channels of the list of useable channels if the currently used channel becomes unusable.

According to a second aspect of the present invention, there is provided a device comprising a memory configured to maintain a list of channels useable for communication, a processor, configured to obtain information on the usability of a currently used channel, and configured to switch to one of the channels of the list of useable channels if the currently used channel becomes unusable. Respective advantageous further developments of the method and/or device are as set out in the corresponding dependent claims.

According to a third aspect of the present invention, there is provided a computer program product comprising computer-executable components which, when the program is run on a computer, are configured to implement the method features as set out in relation to the above mentioned first aspect.

Further, according to a fourth aspect there is provided a method, comprising constructing, at a network node, a list of channels useable for communication, obtaining, at the network node, information on the usability of a currently used channel, instructing to switch to one of the channels of the list of useable channels if the currently used channel becomes unusable.

Likewise, according to a fifth aspect, there is provided a device comprising a processor configured to construct, at a network node, a list of channels useable for communication, and a memory configured to store the constructed list of channels, the processor further configured to obtain, at the network node, information on the usability of a currently used channel, and to instruct to switch to one of the channels of the list of useable channels if the currently used channel becomes unusable.

Respective advantageous further developments of the method and/or device are as set out in the corresponding dependent claims.

The above computer program product may be embodied as a (volatile or non-volatile) computer-readable storage medium.

The methods, devices and computer program products described in this document, at least in exemplary embodiments, use an auxiliary channel list, ACL, to thereby enable to quickly change to an auxiliary channel if the current channel becomes un-useable. A quick change can be accomplished by merely signaling the channel index of the new auxiliary channel that is maintained in the ACL. Moreover, even in case the connection between a communication terminal such as a user equipment UE and a network node such as an evolved Node_B eNB breaks, both devices have a common understanding about the new channel to be used in view of the necessary information being kept up-to-date in the ACL maintained in both devices.

By virtue thereof, it is prevented that a terminal UE always has to blindly try to find the network node eNB from the shared spectrum. Offering auxiliary channels thus also speeds up the re-deployment of the shared spectrum. In addition, configuring virtual channels also speeds up the device attachment to eNB and clarifies the deployment on shared bands.

BRIEF DESCRIPTION OF DRAWINGS

For a more complete understanding of example embodiments of the present invention, reference is now made to the following descriptions taken in connection with the accompanying drawings in which:

FIG. 3 illustrates an exemplary example of an auxiliary channel list ACL while referring to the example of FIG. 2;

DESCRIPTION OF EXEMPLARY EMBODIMENTS

Figure 1:
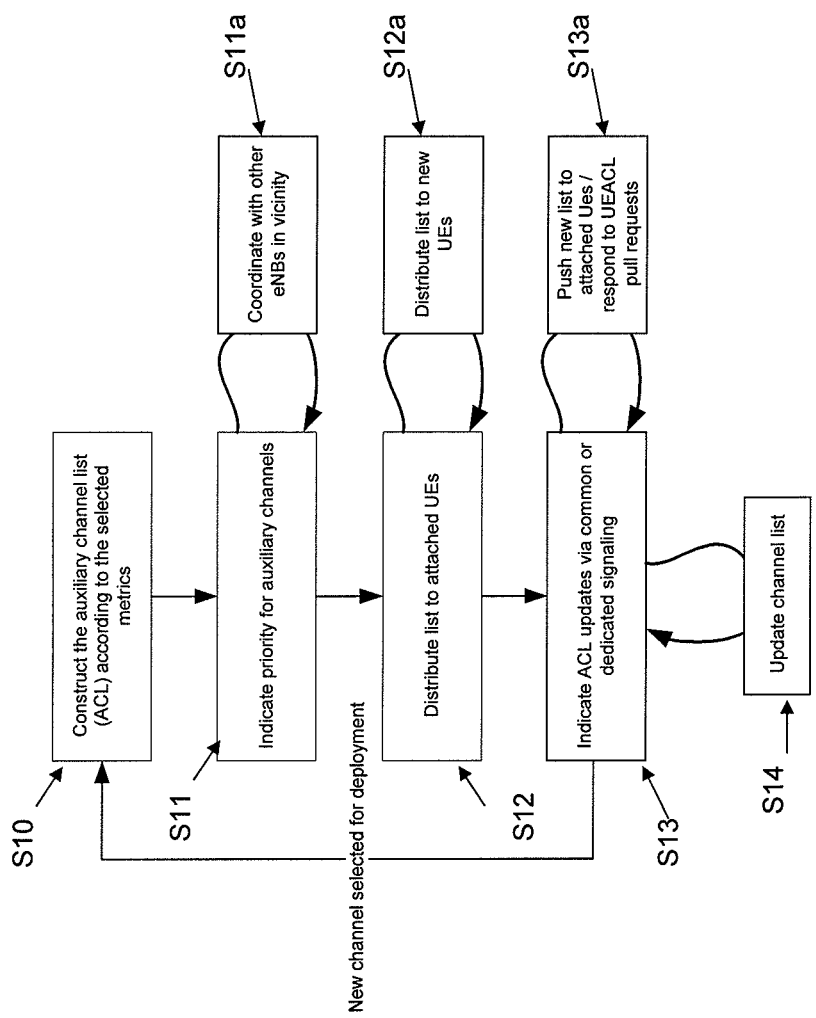
FIG. 1 illustrates procedures related to the auxiliary channel list ACL as performed at a network node side, e.g. at an eNB.

Exemplary aspects of the invention will be described herein below.

Generally, according to one (at least partial) aspect, the invention is implemented in a network node such as an evolved Node_B, eNB. Likewise, according to another (at least partial) aspect, the invention is implemented in a communication terminal device such as an user equipment UE. Both aspects are at least partly interrelated. The invention is mainly implemented in a device such as a processor or chipset residing at the eNB side or at the UE side. Such processor of chipset may be implemented hardware independent, i.e. independent of the hardware technology such as MOS (Metal Oxide Semiconductor), CMOS (Complementary MOS), or ECL (Emitter coupled Logic), or any others. The chipset may be implemented as a DSP (digital signal processor) or as an ASIC (application specific intergrated circuit) or the like. Alternatively, the functionality thereof may be realized, at least in part, as software or computer program product. If implemented as software, the software implementation may be independent of the programming language such as C++, or any other, as long as the functionality is preserved. Embodiments of the present invention may be implemented in software, hardware, application logic or even a combination of software, hardware and application logic.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment or evolved Node_B eNB.

The present invention relates in particular but without limitation to mobile communications, for example to environments under WCDMA, LTE, LTE-A, WIMAX and WLAN and can advantageously be implemented in user equipments or smart phones, or personal computers connectable to such networks. Also, it can be implemented in network devices such as network nodes like an evolved Node_B eNB or an access point AP, or the like.

That is, it can be implemented as/in chipsets to connected devices, network nodes and/or respective modems thereof. More generally, all products which contain an auxiliary channel list ACL managed and exploited as described in relation to at least exemplary embodiments will see performance improvement with the invention being implemented thereto.

The present invention is particularly useful in environments that operate at least not fully on a licensed band or even operate fully on an unlicensed band. A licensed band denotes a band or bandwidth of spectrum reserved for a particular application or system (such as UMTS), whereas an unlicensed band denotes a band or bandwidth of spectrum not reserved for a particular application/system and on which bandwidth users of more than one system may compete to obtain access to and use the available unreserved (shared) bandwidth.

It will be understood from the following description, that if desired, the different functions discussed herein may be performed in a different order and/or concurrently with each other. Furthermore, if desired, one or more of the above-described functions may be optional or may be combined.

FIG. 1 illustrates procedures related to the auxiliary channel list ACL as performed at a network node side, e.g. at an eNB.

The description starts with step S10. In this exemplary embodiment, the eNB operating on a shared band constructs, S10, an auxiliary channel list. The auxiliary channel list (ACL) determines the back-up channels to which the eNB (and an UE) will move once a currently used channel becomes unusable. The channel may become unusable due to interference with other users of the same or different systems, or due to occupancy of the channel by a primary user, e.g. an industrial, scientific, or medical user (in case of the ISM shared band). Or, the coexistence protocol (coexistence protocol may determine that it is more beneficial change the channel) has determined that the channel has to be changed for those or other reasons. The eNB constructs the auxiliary channel list based on measurements (own measurements or reported measurements from UEs) or any other evaluation process. The eNB determines which channels are most suitable channel for its operation and thus for the auxiliary channel list ACL.

Such an evaluation process takes into account e.g. following parameters:
the channel position in the spectrum e.g. whether it is located close to the current channel (e.g. if close, the probability of interference may be higher),
avoid channels which are adjacent to TV channels if the eNB occupies TV WS, avoid channels which may become occupied by an incumbent user soon (this information is provided by a TV WS data base).

The eNB, in step S11, indicates and/or assigns a priority order for the channels listed in ACL (e.g. based on a current interference level or on a predicted interference level, etc.) and allocates an index for each channel for quick reference. The eNB (optionally) maintains the auxiliary channel list in coordination with other eNBs, as illustrated in step S11a. Such process may include a preferred channel list query to other eNBs in vicinity, using an established inter-eNB interface for such communication, or with (local) coexistence manager/coexistence server, or an MME (mobility management entity).

As shown in step S12, the eNB informs the attached terminals UEs about the backup channels by transmitting the ACL. Likewise, newly attaching or registering terminals UE receive the ACL list, e.g. upon entry to the eNB serving area, as shown in step S12a.

Depending on the offered service level, the ACL can be broadcasted or unicasted to the attached UEs. If broadcasted to all attached UEs, a common signaling channel is used, if unicasted to individual UEs, a respective dedicated signaling channel is used, as illustrated in step S13.

If a UE newly registers or attaches to the eNB, the ACL can either be pushed to such UE from the eNB, or the UE issues a pull request to the eNB, responsive to which the eNB then responds by transmitting the ACL list, as shon in step S13a.

Also, as shown in step S14, the eNB regularly runs the ACL selection process to update its preferred backup channels. In connection thereto, the eNB notifies the attached UEs about the changes in the channel list. This can be the content of the changes as such, or a mere indication of a change. If the content is transmitted, the receiving UE incrementally updates its "copy" of the ACL. If the mere indication of the change is signaled, the UE thereafter requests the content, either incrementally or a completely updated ACL, from the eNB.

For example, the eNB optionally sets an expiry timer (as an example of a validity attribute) for the list to prevent old information to be maintained in the UE memory. Then, if the UE keeps an "old" ACL for which the expiry timer is close to expiry (e.g. more than 75% of the ACL lifetime expired), a complete update of the ACL is requested, while if the UE keeps a rather "fresh" ACL (e.g. less than 75% of the ACL lifetime expired) an incremental update of the ACL is requested. Alternatively or additionally, a validity attribute may be defined as a number of occasions a channel was used or attempted to be used.

Those variations for updating the ACL may contribute to balance the transmitted payload in the system, and/or to speed up the ACL update. The ACL list can optionally include the preferred 'cell IDs' of the eNBs belonging to the same network.

The ACL thus mainly serves two purposes: it provides a means to quickly change the channel if it becomes unusable by simply signaling the channel index in the ACL, and, if a connection between eNB and UE breaks, they have common understanding about the new channel to be used for maintaining communication, at least for a control channel, as both keep record of the updated ACL list.

Figure 2:
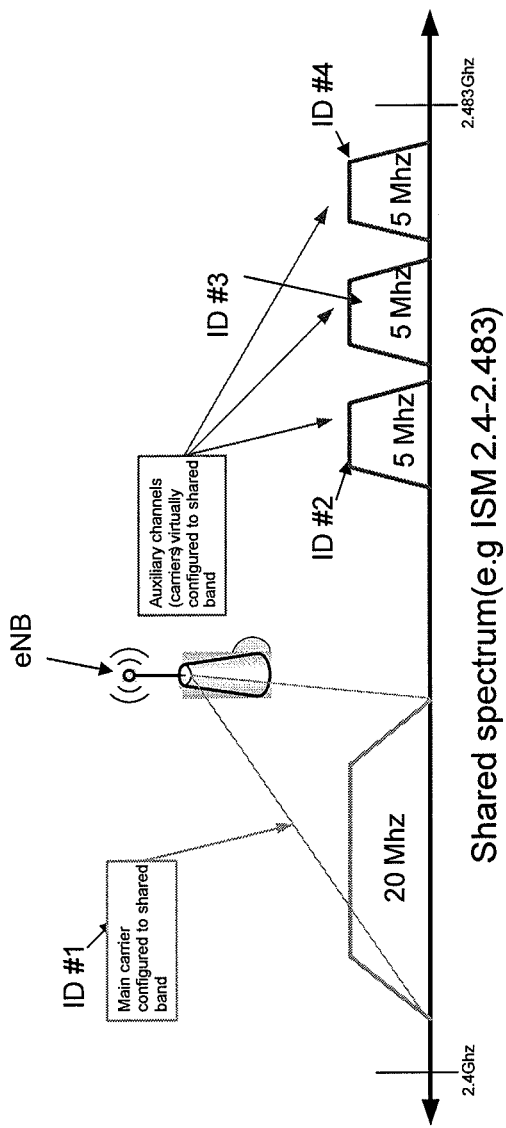
FIG. 2 illustrates an example of virtual and/or free channelization on a shared spectrum with reference to the ISM band.

FIG. 2 illustrates an example of virtual and/or free channelization on a shared spectrum with exemplary reference to the ISM band.

Typically, examples of shared bands are the TV White Space spectrum, TV WS, and the ISM (industrial, scientific, medical) band.

While in TV WS channelization requirements are strict, in some bands such as ISM 2.4 Ghz there is no strict channelization requirement.

The ISM 2.4 GHz band provides for 83 MHz bandwidth in the range from 2.4 GHz to 2.483 GHz, as shown in FIG. 2. This bandwidth can be utilized somewhat freely, taken into account the general regulation (transmit power limitation, duty cycle etc.). The most utilized channelization on ISM 2.4 GHz band is the channelization (conformant to IEEE 802.11) which enables three 20 Mhz channels on 83 Mhz bandwidth (the loose channelization is due to the relaxed outband transmission requirements specified in IEEE). With for example LTE, the ISM band could be utilized more effectively and with virtual channelization the network (effectively the operator) can control frequency utilization and deploy its systems as it is preferred and needed. FIG. 2 also illustrates such an example, in which the network, represented by an evolved Node_B eNB has configured a 20 Mhz channel denoted by ID#1 as a main carrier configured to the shared ISM band and three 5 Mhz channels close to the upper frequency bound, denoted by ID#2, ID#3, and ID#4, respectively, as auxiliary channels or carriers virtually configured to the shared ISM band.

Of course, other channelization can be deployed, as long as the ISM bandwidth is not exceeded. E.g. one or more channels with 20 MHz or 10 MHz in addition to one or more channels of 5 MHz can be configured. The number of 5 MHz channels is not limited to three but can be configured freely while taking into account the remaining channels and ISM bandwidth. Also, a bandwidth of auxiliary channels can differ from the example of 5 MHz, e.g. when using a main carrier of 20 MHz bandwidth, the auxiliary channels may be configured to 10 MHz.

FIG. 3 illustrates an exemplary example of an auxiliary channel list ACL while referring to the example illustrated in FIG. 2.

As explained above in relation to an exemplary embodiment with reference to the ISM band, the eNB/network may generate virtual channelization on the shared band. Considering e.g. a femto eNB as an exemplary eNB of very small coverage area ("similar" to a "pico eNB"), limited in its coverage to, for example, private homes or offices, deployment to shared band and such "femto" or "pico" eNB would be under an operator's control. Upon deployment such eNB, the eNB asks a preferred channel configuration list from the network (either from a new logical element or from an added functionality feature, added to e.g. a mobility management entity MME acting as a local spectrum manager).

The format of such ACL list can be as exemplarily illustatred in FIG. 3. Namely, "Carrier ID" denotes a specific carrier,
"center frequency" denotes around what frequency the carrier is deployed,
"bandwidth" denotes the bandwidth of the channel/carrier, and
"priority" in the priority field denotes priority assigned to such channel, and is added to indicate network preferences.

By configuring the virtual channelization in such way, the eNB and UE or UEs have consensus of the possible channels and deployment in case e.g. the current channel become occupied or interfered, more generally unusable. Naturally, the eNB initiates proactive actions to change the channel upon detecting rising interference; the preconfigured channelization then reduces the signaling overhead and speeds up the selection of a new communication channel. In addition, it provides options for a fallback channel if the current channel suddenly becomes occupied or the connection breaks and the channel reselection signaling is not possible.

Figure 4:
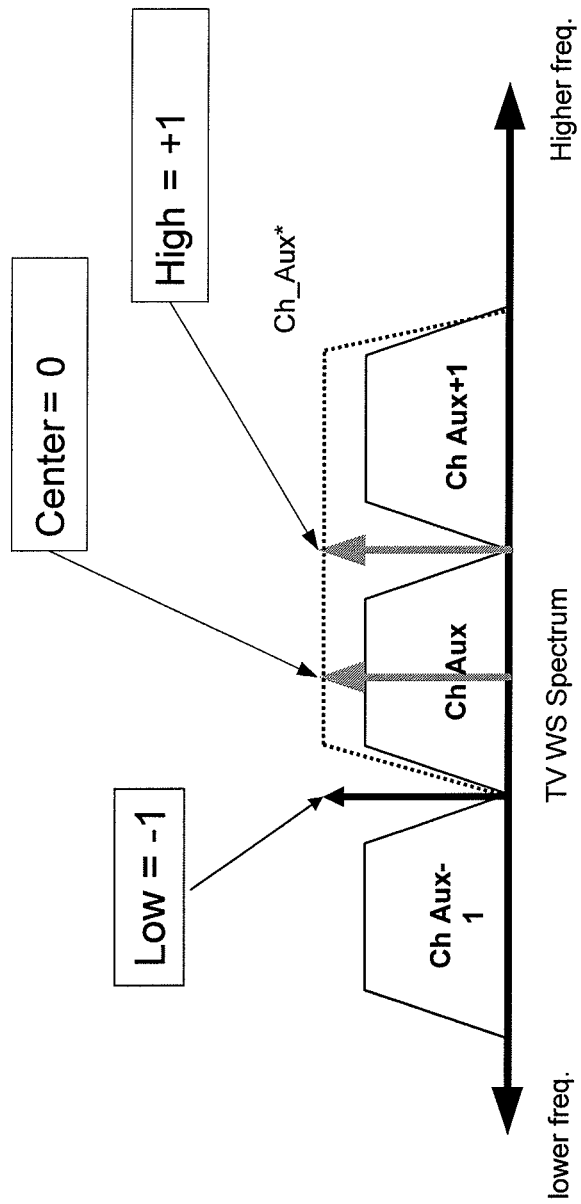
FIG. 4 illustrates an example of channelization on a shared spectrum with reference to the TVWS band.

FIG. 4 illustrates an example of channelization on a shared spectrum with reference to the TVWS band.

For exemplary embodiments in relation to TV WS, those should conform to TV WS regulations as laid down e.g. in FCC 10-174 Appendix B 'Final Rules. Accordingly, a MODE I device(i.e. a terminal such as a user equipment UE) is required to obtain the 'available channel list' from a MODE II/Fixed device (i.e. a network node such as an eNB) before initiating the communication.

Hence, in one exemplary embodiment, the eNB signals in addition to the 'available channel list', the auxiliary channel list ACL mentioned above.

Such ACL list is similar to the one indicated in FIG. 3. The priority order indicated in the ACL, as in the case of FIG. 3, determines the next preferred channel where the AP or eNB will deploy its carrier if the current carrier (primary) will become occupied or the communication degrades too much due to interference, or even breaks.

Optionally, together with the priority order, there is also included the position of the new center frequency relative to the TV Channel center frequency. E.g. "0" denotes "TV channel center frequency", while "+1" denotes "between the TV channel center frequencies of the present one and the adjacent channel with higher frequency". Likewise, "−1" denotes "between the TV channel center frequencies of the present one and the adjacent channel with lower frequency". This is graphically illustrated in FIG. 4.

By indicating the center frequency and its relation to the adjacent channel center frequency, flexible deployment options may be utilized in that it is possible to span the carrier over multiple adjacent channels. The initial deployment bandwidth may thus vary if the carrier can be spanned over multiple adjacent free channels (e.g. it should not always be fixed). Stated in other words, if the "center frequency indicates the center frequency of Ch_Aux and parameter "center=0", then the auxiliary channel has the bandwidth of Ch_Aux only (the one illustrated in the middle of FIG. 4). However, if the "center frequency" indicates the center frequency of Ch_Aux and parameter "high=+1", then the auxiliary channel has the bandwidth of "Ch Aux" and "Ch Aux+1", thus doubled bandwidth in this example and as illustrated by the dotted envelope curve labeled Ch_Aux*.

The eNB and/or another network entity can configure the parameters for indicating the high and low values. For example, if only one bit is used, the parameter can have values 'center' and 'high', or alternatively 'center' and 'low'.

Using multiple bits, the parameter has more values as e.g. in the illustrated example, in which the values low, center, and high (3 values) need to be distinguished and thus appropriately coded, for which typically 2 bits are required. A possible exemplary coding scheme could reside in 10=low, 00=center, and 01=high.

Optionally dwell time on each channel (how long the eNB will stay on the backup channel before trying another backup channel) can be indicated in the table. Such indicator can optionally also be added to the table shown in FIG. 3 for the ISM band.

In addition according to exemplary FCC regulations mentioned above, MODE I device (UE) is required to hear the 'Contact Verification Signal, CVS' from the fixed/MODE II device (eNB) which provided the available channel list regularly, at least once every 60 sec. Other update intervals may be applied in case other rules have to be met, or a shorter interval may be applied.

In an exemplary embodiment, the eNB thus informs in the contact verification signal with one flag bit if the channel preference list, i.e. the auxiliary channel list (ACL) has changes. On UE side, upon reception the flagged CVS the UE requests new preferred channel list that is thus pulled from the eNB. Alternatively the new channel preference list is fully retransmitted (pushed to the associated UEs by eNB).

Figure 5:
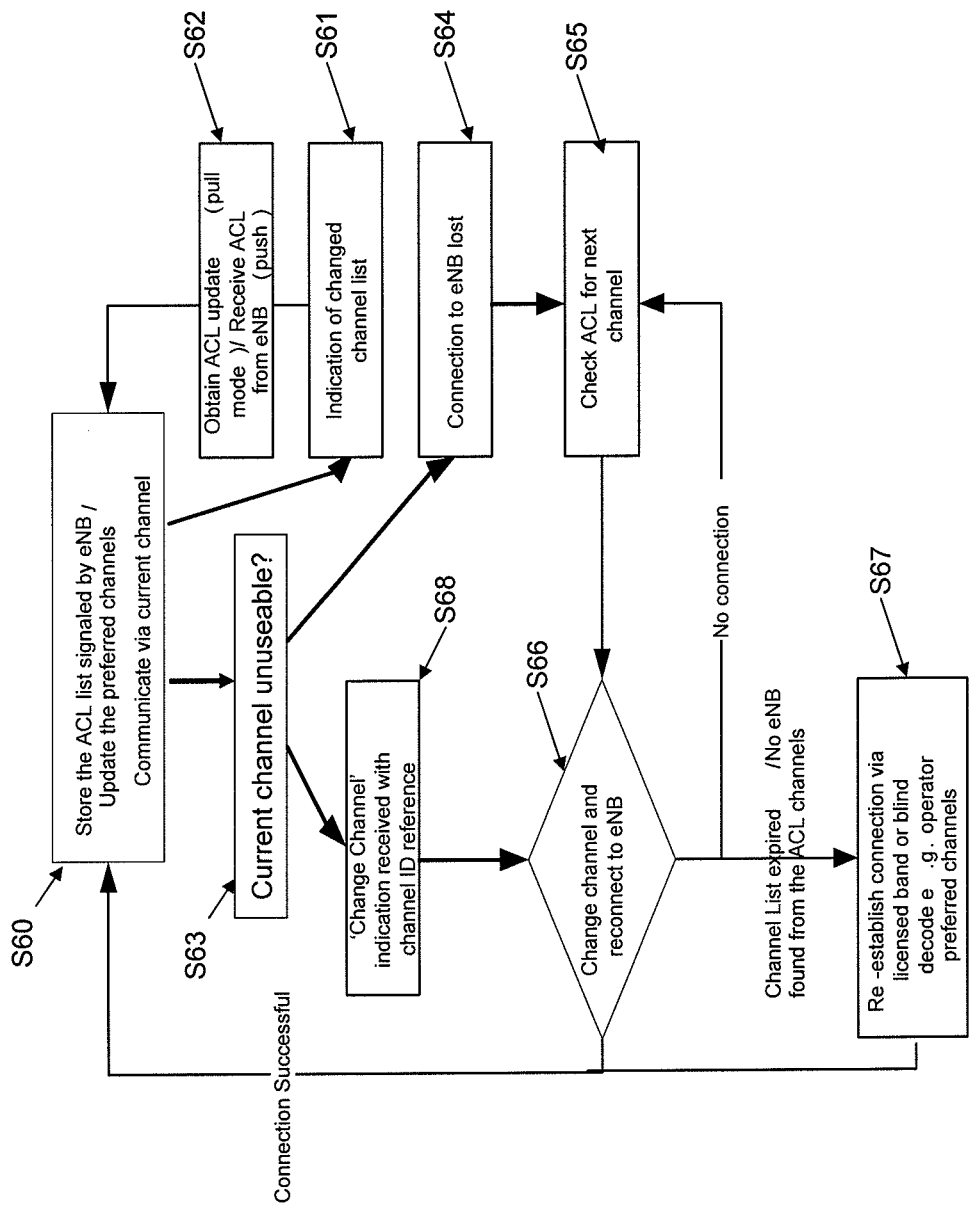
FIG. 5 illustrates procedures related to the auxiliary channel list ACL as performed at a communication terminal device side, e.g. at an UE.

FIG. 5 illustrates procedures related to the auxiliary channel list ACL as performed at a communication terminal device side, e.g. at an UE. The UE side actions in ACL procedure is illustrated in the FIG. 5. The procedure exemplarily specifies fault cases where the eNB cannot be found from the Auxiliary channel list and UE is forced to reconnect via licensed band (if such option exists) or to remain on shared band and try to blindly decode e.g. the operator preferred default channels.

It is to be noted that features and/or stages illustrated in FIG. 5 are not all carried out in a consecutive order. Rather, FIG. 5 illustrates certain states of a terminal device such as a user equipment or similar device and certain stages carried out starting in a specific stage or state leading to a subsequent stage or state.

In order to describe this transmission, the description of FIG. 5 is started with stage S60. In stage S60, the user equipment stores the auxiliary channel list ACL as signaled by a network node such as an eNB. Either the complete is list is signaled and stored, or an update thereof is signaled and stored. The UE than updates its own ACL list which generally is a complete copy or mirror of the ACL list maintained at the eNB.

Using such list, the UE communicates via a currently assigned channel, in normal condition, this is a so called main channel or the channel of highest priority. If in such a stage, an ACL list is updated at the eNB, the process at the UE advances to stage S61 where an indication of changed channel list is received.

Subsequently, in stage S62, the UE obtains an ACL update, either by pulling the list from the eNB in a pull mode upon issuing a corresponding request to the eNB, or by receiving an ACL update from the eNB in a push mode. Such update may be a complete copy of the ACL list or an incremental update of the ACL list as mentioned herein above.

After stage S62, the process comes back to stage S60 described before. In another scenario, the process may advance from stage S60 to stage S63 when it is detected that the current channel becomes unusable. A channel may be come unusable due to increased interference or due to another systems user accessing the channel, e.g. in ISM band, or the like. Also, the channel is evaluated as unusable if the connection with the eNB is completely lost.

If the current channel becomes unusable, under "normal conditions" the eNB signals a "change channel" indication that is received with the channel ID reference in a stage S68 at the user equipment. The channel ID is similar or identical to the carrier ID illustrated in FIG. 3, for example. Then, in a stage S66 the channel is changed to the indicated channel denoted by the channel ID and the UE reconnects the eNB. If the connection is thus successful, the process returns to stage S60.

Optionally, at a later point of time, the same stages may be transited again if the new channel as the current channel becomes unusable.

On the other hand, if the current channel is found to be unusable because the connection to the eNB is completely lost, the process advances from stage S63 to stage S64 were a situation of a lost connection to eNB is handled. In such stage, no signaling can be received from the eNB so that the UE then in stage S65 checks the ACL that it maintains in its memory for a next channel. The next channel is thus the channel having the highest following priority. If for example the previous communication was carried on a channel of priority 2, the next channel checked is for example the one of priority 3.

Alternatively, also a channel with higher priority can be checked although, if communication has been conducted on a channel of priority 2, it can be assumed that channel of priority 1 may have failed beforehand. However, after certain time after changing to a channel of priority 2 has lapsed, it could be tried to find out whether higher priority channels have become available again.

In any case, after checking the ACL for a next channel, the procedure advances to stage S66 where the UE changes the channel to the next channel and reconnects to the eNB. If connection was successful, the process advances again to stage S60. If however the reconnection was not successful, the process goes back to stage S65 and it is checked for a next channel. Normally, the next channel is then the next channel of even lower priority.

In this way, the stages loops via stage S65 and stage S66 until no further channel is on the ACL and a reconnection was not successful. Thus, if based on the available ACL channels on the list a reconnection to an eNB was not possible and no eNB was found, the process advances to stage S67 where the UE tries to reestablish connection either via a licensed band or blindly decodes for example the operators preferred channels as a further and potentially final fallback position.

If connection was successful, the process advances to stage S60. Alternatively, as mentioned before, the ACL list may be attributed with an expiry date. Therefore, if the channel list expired while reconnection was tried using channels on the ACL list, also connection is reestablished via stage S67 using either licensed band or blindly decoding for example operators preferred channels.

If also via this stage, no successful reconnection is obtained, an error processing (not shown) is performed or, simply the connection to eNB remains lost until a later point of time.

Figure 6:
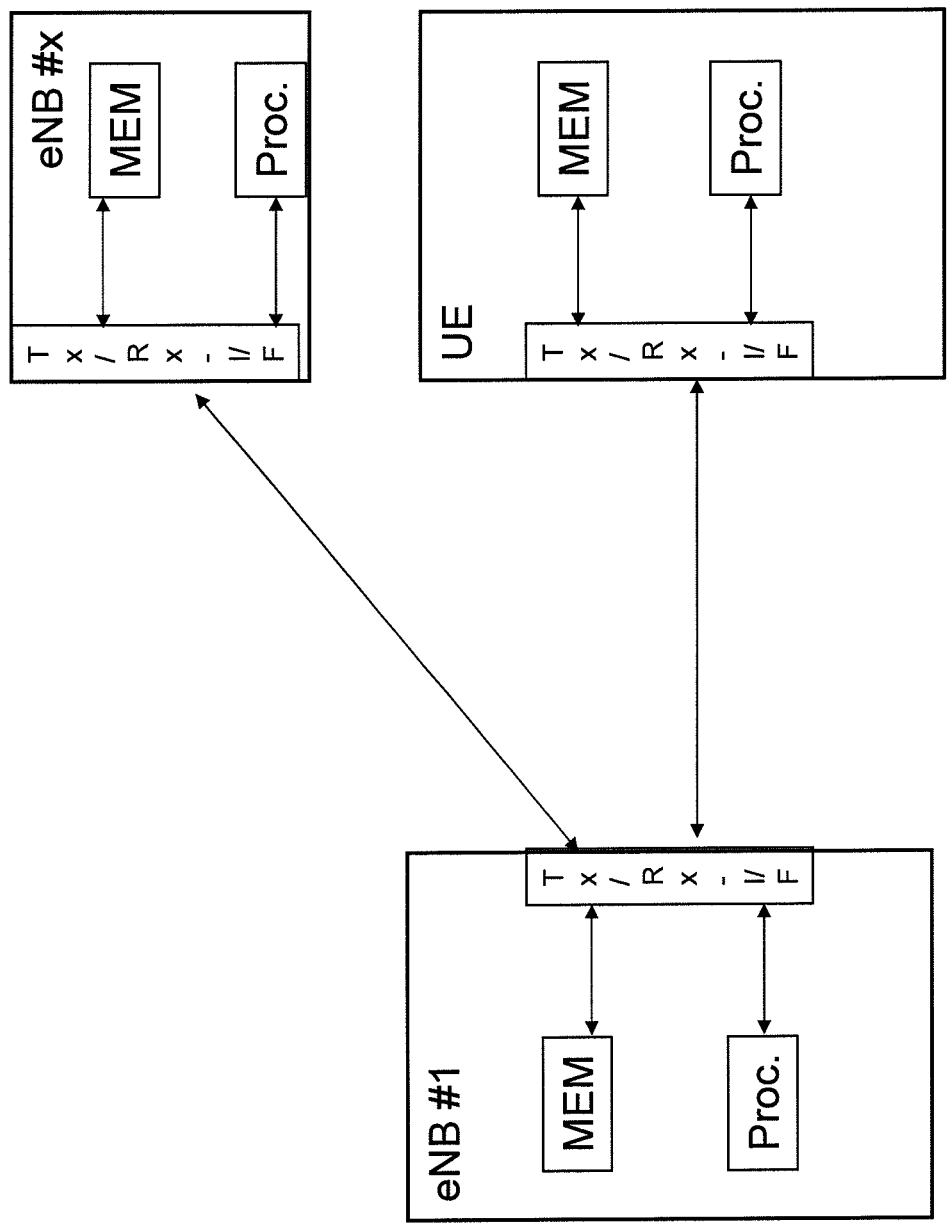
FIG. 6 shows a basic block circuit diagram illustrating exemplary network nodes as well as an exemplary communication terminal.

FIG. 6 shows a basic block circuit diagram illustrating an eNB#1 and an eNB#x as exemplary network nodes as well as illustrating a user equipment UE as an exemplary communication terminal.

Basically, each eNB has a substantially similar internal construction, and can be represented by a transmitter/receiver interface TX/RX-I/F, a memory MEM and a processor Proc. A network node communicates via the Tx/Rx-I/F with other network nodes as well as with a communication terminal UE. Also internally, the processor Proc. May access and read and/or write data from/to the memory via that interface, which may comprise e.g. a databus.

In terms of a network node as a device, such device thus comprises a processor configured to construct, at a network node, a list of channels useable for communication, and a memory configured to store the constructed list of channels, the processor being further configured to obtain, at the network node, information on the usability of a currently used channel, and to instruct to switch to one of the channels of the list of useable channels if the currently used channel becomes unusable.

The processor is further configured to re-connect to a communication terminal via the channel to which it was instructed to be switched, and/or optionally to detect at the network node that a connection to a communication terminal is lost. In the memory, the stored list of channels is associated with a validity attribute (and other attributes as shown e.g. in and described in relation to FIG. 3), and the processor is further configured to re-establish a connection to a communication terminal via a predetermined channel or blindly via an arbitrary channel, in the event that the validity of the list of channels expired and a currently used channel becomes unusable. The processor is further configured to update the list of channels in case an update criterion is fulfilled, wherein said update criterion is an indication of a changed channel list to be coordinated being available at another network node, or an expiry of a validity attribute associated with the list of channels. Moreover, in such device, the processor is further configured to distribute the list of channels to communication terminals using a push mode or a pull mode.

In terms of a communication terminal as a device, such device thus comprises a memory configured to maintain a list of channels useable for communication, a processor, configured to obtain information on the usability of a currently used channel, and configured to switch to one of the channels of the list of useable channels if the currently used channel becomes unusable. The processor is further configured to re-connect to a network node via the channel to which switching was performed.

Also, the processor is further configured to switch to another one of the channels of the list of useable channels, if the re-connecting via the channel to which switching was performed was unsuccessful.

Likewise, the processor is further configured to re-establish a connection to the network node via a predetermined channel or blindly via an arbitrary channel, in the event that the re-connecting failed for each channel of the list. The list of channels is associated with a validity attribute (and other attributes as shown e.g. in and described in relation to FIG. 3), and the processor is further configured to re-establish a connection to a network node via a predetermined channel or blindly via an arbitrary channel, in the event that the validity of the list of channels expired and a currently used channel becomes unusable. In addition, the processor is further configured to update the list of channels from a network node in case an update criterion is fulfilled. Such update criterion is an indication of a changed channel list being available at the network node, or an expiry of a validity attribute associated with the list of channels. Also, the processor is further configured to pull, from the network node, the updated list of useable channels, or to receive, from the network node, a pushed list of useable channels. The processor is further configured to receive a request from a network node to switch to one of the channels of the list, or detect that a connection to a network node is lost.

Although the description of the block circuit diagrams has been given in brief only, it is understood that the processor and the memory, respectively, with the respective computer program products as described an dislcosed herein, in cooperation accomplish the respective method aspects at the communication terminal side and the network node side, respectively. Those have been described in detail herein above so that a repeated and description thereof is dispensable here.

Thus, as has been described herein before with reference to one or more exemplary embodiments, one or more of the following advantages are realized:
  it is prevented that the UE blindly trys to find the eNB from the shared spectrum,
  the re-deployment is speeded up by offered auxiliary channels,
  the device attachment to eNBis speeded up by configuring virtual channels and
  the deployment on shared bands is clarified.

Also, the method, devices and computer program products presented herein are generally applicable to all scenarios and/or systems which operate on non-licensed and/or shared bands. Other systems can benefit also from the principles presented herein.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

As described above, the present invention proposes methods and devices for mobile communication deployed on shared bands, which enhance reliability of channels such as control channels. According to an aspect thereof, at a communication terminal, a list of channels useable for communication is maintained, information on the usability of a currently used channel is obtained, and it is switched to one of the channels of the list of useable channels if the currently used channel becomes unusable. The invention encompasses also corresponding computer products as well as methods, devices and computer products residing at a network node.

What is claimed is:

1. A method, comprising maintaining, at a communication terminal, a list of channels useable for communication, wherein the maintaining comprises updating the list of channels from a network node in case an update criterion is fulfilled, wherein said update criterion comprises an expiry timer indicating when the list of channels is valid, and wherein the updating comprises pulling, from the network node, the updated list of channels, obtaining, at the communication terminal, information on usability of a currently used channel, and switching, at the communication terminal, to one of the channels of the updated list of channels if the currently used channel becomes unusable; wherein prior to a threshold of the expiry timer an incremental update of the list is pulled from the network node, and following the threshold of the expiry timer a complete update of the list is pulled from the network node.

2. The method according to claim 1, further comprising re-connecting to the network node via the channel to which switching was performed.

3. The method according to claim 2, further comprising switching, at the communication terminal, to another one of the channels of the list of channels, if the re-connecting via the channel to which switching was performed was unsuccessful.

4. The method according to claim 3, further comprising re-establishing a connection to the network node via a predetermined channel or blindly via an arbitrary channel, in the event that the re-connecting failed for each channel of the list.

5. The method according to claim 1, wherein the list of channels further comprises per-channel attributes including a carrier ID, a center frequency, a bandwidth and a priority for each channel, and further comprising re-establishing a connection to the network node via a predetermined channel or blindly via an arbitrary channel, in the event that the expiry timer has expired and the currently used channel becomes unusable.

6. The method according to claim 1, wherein said update criterions further comprises, for each of the channels of the list, a validity attribute being a number of occasions on which the respective channel was used or attempted to be used.

7. The method according to claim 1, wherein the obtaining further comprises receiving a request from the network node to switch to one of the channels of the list, or detecting at the communication terminal that a connection to the network node is lost.

8. A device, comprising: a memory configured to maintain a list of channels useable for communication, and a processor, configured to obtain information on usability of a currently used channel, and configured to switch to one of the channels of the list of channels if the currently used channel becomes unusable, wherein the processor is further configured to update the list of channels from a network node in case an update criterion is fulfilled and to pull, from the network node, the updated list of channels, wherein said update criterion comprises an expiry timer indicating when the list of channels is valid; and wherein prior to a threshold of the expiry timer an incremental update of the list is pulled from the network node, and following the threshold of the expiry timer a complete update of the list is pulled from the network node.

9. The device according to claim 8, wherein the processor is further configured to re-connect to the network node via the channel to which switching was performed.

10. The device according to claim 9, wherein the processor is further configured to switch to another one of the channels of the list of channels, if the re-connecting via the channel to which switching was performed was unsuccessful.

11. The device according to claim 10, wherein the processor is further configured to re-establish a connection to the network node via a predetermined channel or blindly via an arbitrary channel, in the event that the re-connecting failed for each channel of the list.

12. The device according to claim 8, wherein
the list of channels further comprises per-channel attributes including a carrier ID, a center frequency, a bandwidth and a priority for each channel, and
wherein the processor is further configured to re-establish a connection to the network node via a predetermined channel or blindly via an arbitrary channel, in the event that the expiry timer has expired and the expires used channel becomes unusable.

13. The device according to claim 8, wherein said update criterion further comprises, for each of the channels of the list, a validity attribute being a number of occasions on which the respective channel was used or attempted to be used.

14. The device according to claim 8, wherein the processor is further configured to receive, from the network node, a pushed list of channels.

15. The device according to claim 8, wherein the processor is further configured to receive a request from the network node to switch to one of the channels of the list, or detect that a connection to the network node is lost.

16. A computer program product comprising a non-transitory computer-readable storage medium storing computer-executable components which, when run on a computer, are configured to maintain, at a communication terminal, a list of channels useable for communication, wherein the computer-executable components are configured to maintain the list of channels by updating the list of channels from a network node in case an update criterion is fulfilled, wherein said update criterion comprises an expiry timer indicating when the list of channels is valid, and wherein the computer-executable components are configured to update the list of channels by pulling, from the network node, the updated list of channels, obtain, at the communication terminal, information on usability of a currently used channel, and switch, at the communication terminal, to one of the channels of the updated list of channels if the currently used channel becomes unusable; wherein prior to a threshold of the expiry timer an incremental update of the list is pulled from the network node, and following the threshold of the expiry timer a complete update of the list is pulled from the network node.

17. A method, comprising constructing, at a network node, a list of channels useable for communication, wherein the constructing further comprises updating the list of channels in case an update criterion is fulfilled, wherein said update criterion comprises an expiry timer indicating when the list of channels is valid, obtaining, at the network node, information on usability of a currently used channel, instructing to switch to one of the channels of the updated list of channels if the currently used channel becomes unusable, and distributing the updated list of channels to communication terminals using a pull model in which a communication terminal causes the updated list of channels to be pulled from the network node, the updated list comprising an incremental update of the list of channels when the updating is prior to a threshold of the expiry timer and comprising a complete update of the list of channels when the updating follows the threshold of the expiry timer.

18. The method according to claim 17, further comprising re-connecting to the communication terminal via the channel to which it was instructed to be switched, and/or optionally wherein the obtaining further comprises detecting at the network node that a connection to a communication terminal is lost.

19. The method according to claim 17, wherein the list of channels further comprise per-channel attributes including a carrier ID, a center frequency, a bandwidth and a priority for each channel, and further comprising re-establishing a connection to the communication terminal via a predetermined channel or blindly via an arbitrary channel, in the event that the expiry timer has expired and the currently used channel becomes unusable.

20. The method according to claim 17, wherein said update criterion further comprises, for each of the channels of the list, a validity attribute being a number of occasions on which the respective channel was used or attempted to be used.

21. A device, comprising a processor configured to construct, at a network node, a list of channels useable for communication, and a memory configured to store the constructed list of channels, the processor further configured to obtain, at the network node, information on usability of a currently used channel, and to instruct a communication terminal to switch to one of the channels of the list of channels if the currently used channel becomes unusable, wherein the processor is further configured to update the list of channels in case an update criterion is fulfilled and to distribute the updated list of channels to communication terminals using a pull mode in which the communication terminal causes the updated list of channels to be pulled from the network node, wherein said update criterion comprises an expiry timer indicating when the list of channels is valid and the updated list comprises an incremental update of the list of channels when the updating is prior to a threshold of the expiry timer and comprises a complete update of the list of channels when the updating follows the threshold of the expiry timer.

22. The device according to claim 21, wherein the processor is further configured to re-connect to a communication terminal via the channel to which said communication terminal was instructed to switch, and/or to detect at the network node that a connection to the communication terminal is lost.

23. The device according to claim 21, wherein the list of channels stored in the memory further comprise per-channel attributes including a carrier ID, a center frequency, a bandwidth and a priority for each channel, and the processor is further configured to re-establish a connection to the communication terminal via a predetermined channel or blindly via an arbitrary channel, in the event that the expiry timer has expired and the currently used channel becomes unusable.

24. The device according to claim 21, wherein said update criterion further comprises, for each of the channels of the list, a validity attribute being a number of occasions on which the respective channel was used or attempted to be used.

25. The device according to claim 24, wherein the processor is further configured to distribute the list of channels to communication terminals using a push mode.

* * * * *

UNITED STATES PATENT AND TRADEMARK OFFICE
CERTIFICATE OF CORRECTION

PATENT NO. : 8,948,771 B2  
APPLICATION NO. : 13/086681  
DATED : February 3, 2015  
INVENTOR(S) : Koskela et al.

Page 1 of 1

It is certified that error appears in the above-identified patent and that said Letters Patent is hereby corrected as shown below:

In the claims

Column 14, line 37, Claim 25, delete "24" and insert --21-- after according to claim Signed and Sealed this
Nineteenth Day of April, 2016

Michelle K. Lee
*Director of the United States Patent and Trademark Office*